Patented Mar. 17, 1925.

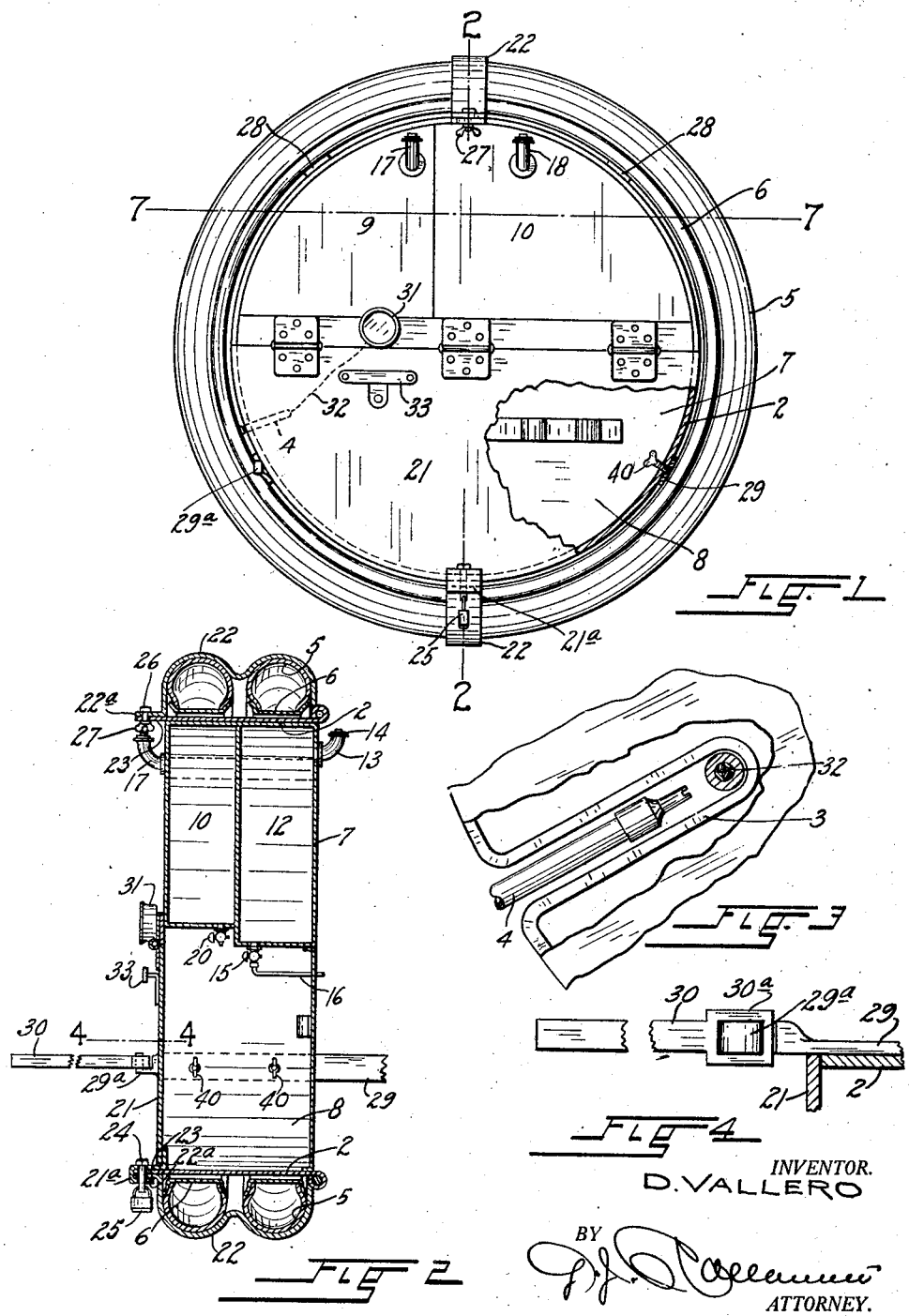

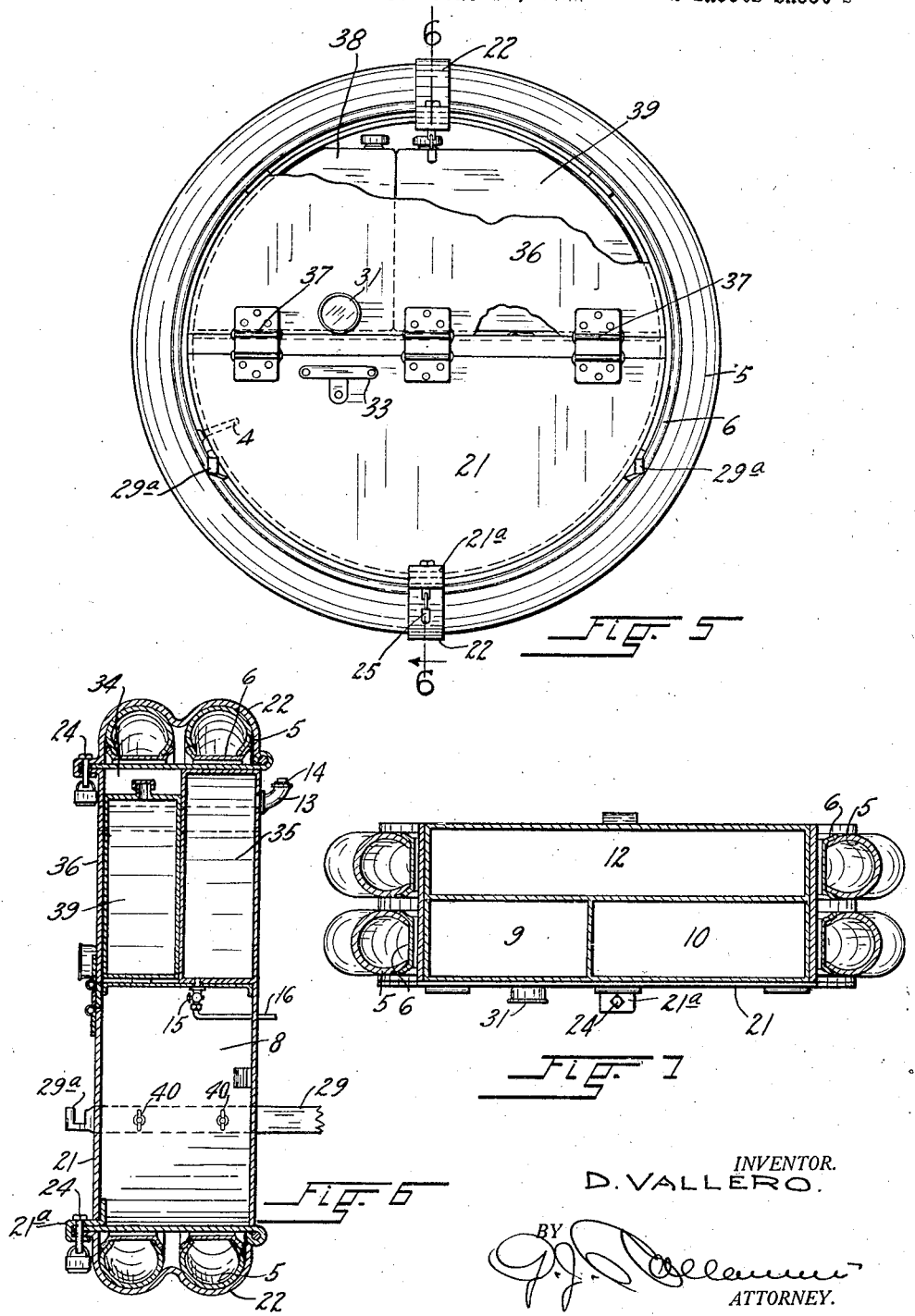

1,529,855

UNITED STATES PATENT OFFICE.

DOMONICK VALLERO, OF DENVER, COLORADO.

TIRE RACK FOR AUTOMOBILES.

Application filed June 14, 1922. Serial No. 568,178.

*To all whom it may concern:*

Be it known that I, DOMONICK VALLERO, a citizen of the United States, residing at Denver, in the county of Denver and State of Colorado, have invented certain new and useful Improvements in Tire Racks for Automobiles, of which the following is a specification.

My invention relates to improvements in tire racks and its principal object is to provide in conjunction with a circular rack of the type used on automobiles to hold spare pneumatic tires, a case adapted to contain oil, water, gasoline, and other commodities in separate compartments.

Another object of the invention is to provide in a tire rack of the above described character, locking means which secure one or more tires supported thereon, against removal and at the same time prevent unauthorized access to the compartments of the case.

Still another object is to provide in connection with a tire rack, brackets for fastening it to the vehicle, which are equipped with detachable extensions for the support of luggage, and further objects reside in details of construction and novel arrangements of parts, as will fully appear in the course of the following description.

In the accompanying drawings, in the various views of which like parts are similarly designated, Figure 1 represents a partially sectional elevation of my improved tire rack;

Figure 2, a section on the line 2—2, Figure 1;

Figure 3, an enlarged section through a portion of the circular part of the device showing the recess which, in practice, admits the valve stems of pneumatic tires supported on said part;

Figure 4, a fragmentary section on the line 4—4, Figure 2, drawn to an enlarged scale;

Figure 5, an elevation similar to that of Figure 1 showing a modified construction of the invention;

Figure 6, a section along the line 6—6, Figure 5; and

Figure 7, a section taken on the line 7—7, Figure 1.

Referring more specifically to the drawings, the reference character 2 designates a circular drum adapted to support one or two pneumatic tires 5 on demountable rims 6, and provided with a transverse, inwardly projecting recess 3 to admit the valve-tubes 4 of the tires. In case the rims of the tires to be supported on the rack are equipped with lugs of the kind used in certain makes of automobiles to fasten the tire rims upon the wheels, the recess 3 of the drum is made shallower and of sufficient width to admit the lugs.

The space inside the drum is inclosed to provide a case 7 which is divided into a lower compartment 8 adapted to contain tools, repair parts, tire chains, clothes and other similar articles, and upper compartments 9, 10 and 12 which are made liquid-tight to contain water, oil and gasoline.

The rear one of the three liquid compartments extends across the entire width of the case, as shown in Figure 7, and is preferably used for the storage of gasoline. It has a filler neck 13 closed by a screw-cap 14 and a drain-cock 15 which if so desired, may be connected with the ordinary gasoline tank of the vehicle to which the rack is applied, by means of a pipe 16.

The other two compartments in the upper portion of the case, are intended to contain oil and water respectively, and they are also equipped with cap-closed filler necks 17 and 18 and with drain-cocks 19 and 20.

The drain-cocks of the three liquid-containers of the case are inside the lower half of the same, so that in order to obtain any of the liquids contained in the upper compartments, it is necessary that access be had to the compartment 8 which normally is closed at the front of the case by means of a hinged door 21.

Hasps 22 hinged at the rear edge of the drum, are formed to fit across the tires supported thereon, and they have forwardly projecting apertured lips 22ª which engage with correspondingly apertured lugs 23 at the front edge of the drum.

The door 21 which closes the lower compartment of the case has an integral channeled clasp 21ª adapted to embrace the joined lug and lip of one of the fastenings, and provided with openings which register with the apertures of the same.

A bolt 24 inserted in the registering openings, functions to secure the door as well as the hasp, and a padlock 25 passing through an opening in the lower end of the bolt, serves to lock the same against withdrawal.

The lip of the other hasp is fastened to the corresponding lug of the drum by means of a bolt 26 and a wing-nut 27. The drum has upon its outer surface a plurality of spacing-plates 28 and 29 which engage with the demountable rims of the tires supported on the rack, and two of these plates (29) on the lower half of the drum are extended rearwardly thereof to provide brackets for the connection of the rack with suitable parts of the vehicle which it is attached.

The brackets are extended at the front of the rack and formed into hooks 29ª of angular section which provide convenient means for the support of arms 30 having correspondingly formed eyes 30ª. The arms when fastened on the hooks provide conjointly an auxiliary medium for the support of tools, tenting or other luggage.

The opposite ends of the brackets are extended as far as is necessary to securely fasten them to a convenient part of the vehicle, and any means may be provided to secure the brackets in place.

Inasmuch as these means vary in accordance with the construction of the vehicle to which the appliance is attached and are not part of the present invention, they have not been shown in the drawings.

Set-screws 40 extended from the inside of the lower compartment through threaded apertures in the circular wall of the case and the brackets 29 fastened exteriorly thereof, provide a convenient and effective means for clamping the tires against displacement on the rack by engagement with the rims thereof.

The rack constructed as shown and described, may also be utilized to hold the tail light 31 of the automobile, the wires 32 of which can be passed through the recess 3 of the drum in which the valve-tubes extend, as clearly shown in Figure 3 of the drawings.

A bracket 33 on the door of the case, beneath the tail light, provides a practical means for fastening a license plate.

It will be understood that in the use of my invention, the rack is supported at the rear of the vehicle and that the circular or drum part thereof, is very similar to the tire racks with which most modern motor vehicles are equipped.

The case formed inside of the drum, however, is novel in that it utilizes a space which was heretofore wasted, for the storage of the liquids required in the operation of the vehicle, and the safekeeping of tools and other accessories.

The fastenings of which the hinged hasps are a part, provide a simple, practical and effective means for securing both the tire or tires supported on the drum, and the door which closes the lower compartment, and the lock applied to the lower fastening prevents removal of the tires and restrains unauthorized persons from procuring the liquids, tools and other supplies contained in the case.

In the form of my invention illustrated in Figures 5 and 6 of the drawings, the upper portion of the case is divided into two compartments 34 and 35, the rear one of which is adapted to contain gasoline and is equipped with a filler cap and drain-cock as before, and the other one of which is normally closed by a door 36 hinged as at 37 and locked in its closed position by means identical to those shown and described with reference to the door of the lower compartment.

Loosely fitted in the compartment 34 are two containers 38 and 39 provided to hold water and oil respectively, and each is equipped with a cap-closed neck through which they may be filled or emptied after being removed from the case.

Having thus described my invention, what I claim and desire to secure by Letters Patent is:

1. A tire rack for automobiles comprising a circular case having a forwardly projecting lug, a door closing an opening in the front of the case and having a projection registering with the lug, a hasp adapted to secure a tire upon the case and having a lip likewise registering with the lug, the lug, the projection and the lip having alined openings, and a locking element having a member passing through said openings.

2. A tire rack for automobiles comprising a case adapted to support a surrounding tire and interiorly divided into compartments one of which is adapted to contain a liquid and has a drain cock inside another compartment, and a normally locked door closing the last mentioned compartment against access to the drain cock.

3. A tire rack for automobiles comprising a case adapted to support a surrounding tire and including a container for liquid fuel, a valve-controlled conduit for connecting the container with a fuel tank on the vehicle, and means for fastening the case to a motor vehicle.

4. A tire rack for automobiles comprising a circular case, spacing members extending across the periphery of the case, set screws extending through the casing and the spacing members, adapted to bear upon the rims of tires mounted on the casing, and brackets extending from the spacing members.

5. A tire rack for automobiles comprising a circular case adapted to support a surrounding tire, and brackets on the case for fastening it to a motor vehicle, the brackets having hook-shaped extremities for the support of an element rearward of the case.

In testimony whereof I have affixed my signature.

DOMONICK VALLERO.